June 28, 1949. J. M. WYER 2,474,508
SUCTION-OPERATED CHUCK
Filed Sept. 30, 1946

Inventor.
John Mansfield Wyer,
by Lester L. Sargent
Attorney.

Patented June 28, 1949

2,474,508

UNITED STATES PATENT OFFICE 2,474,508

SUCTION-OPERATED CHUCK

John M. Wyer, Perton, Pattingham,
near Wolverhampton, England

Application September 30, 1946, Serial No. 700,221
In Great Britain October 3, 1945

4 Claims. (Cl. 279—3)

In a known method of holding articles which are rotated for some operation to be performed on them, they are mounted on, or in, a rotating chuck and held in position by suction induced in a suction pipe by a suction pump, a controlling valve or valves having been placed in the pipe.

The suction in the chuck causes air to flow thereinto because the article does not make a completely sealed joint with the chuck; and there has heretofore been the disadvantage that dust, or other matter, due to the operation or other cause, has been taken into the chuck with the entering air. As a consequence the dust has entered and accumulated in the operating valves and suction pump and this necessitates frequent cleaning of the valves and pump.

The invention has for its object to provide means whereby this disadvantage is eliminated.

According to this invention a filter is provided in the chuck to arrest the dust and retain it in the chuck and so prevent it from passing to the suction pipe line.

Convenient embodiments of the invention are described with reference to the accompanying drawings, in which.

Figure 1:
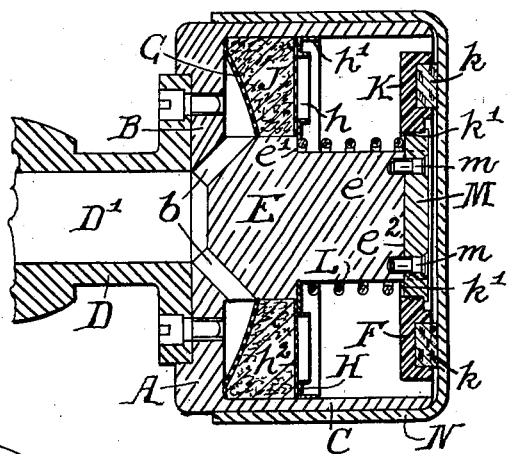
Figure 1 is a view in longitudinal section of one form of the chuck, the section being taken on the line 1, 1, of Figure 2. In this view there is shown a hollow utensil in position on the chuck.
Figure 3:
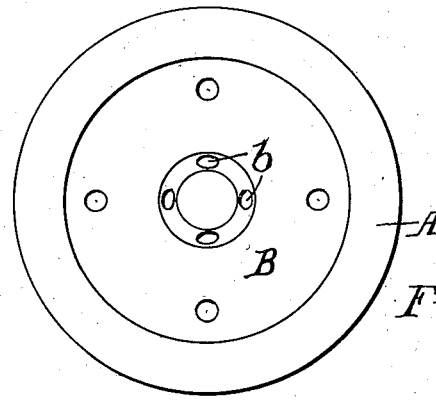
Figure 3 is a rear end view of the chuck detached from its carrier.
Figure 2:
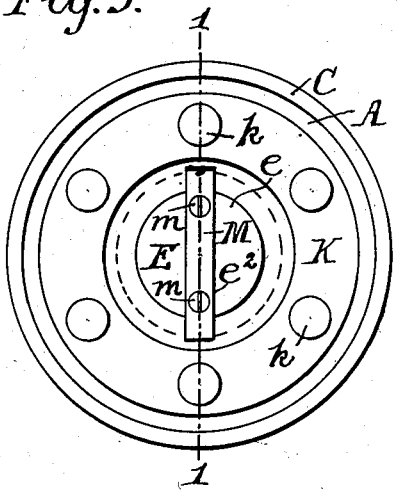
Figure 2 is a front end view of the chuck.

Referring first to Figures 1, 2 and 3, A is the main body or shell of the chuck having a base or rear wall B and a cylindrical wall C. The base B is spigoted to a rotatable carrier D which has an axial passage D' through which suction is applied.

Integral with the base B is an arbor E of much less diameter than the internal diameter of the wall C so as to leave a wide annular space F between the periphery of the arbor and the wall C. The outer end $e$ of the arbor is of reduced diameter so as to leave a shoulder $e'$.

Slanting ports $b$ connect between the passage D' and the annular space F.

G is a ring of metal gauze pressed to part-spherical form and butted up, at its marginal portion, to the base B; and H is an annular metal disc having relatively large flanged perforations $h$ and having a deep forward flange $h'$ at its periphery which is an easy fit in the wall C. The inner marginal portion of the disc H lies against the shoulder $e'$ of the arbor E. Placed against the rear face of the disc H is an annular piece of gauze $h^2$ and between the latter and the gauze G there is placed wire wool or like material J which acts as the filter.

K is an annular plate of plastic material surrounding and being a sliding fit on the forward end of the arbor E. Set in the forward face of the plate K are insets $k$ of cork or other resilient material. A coil spring L surrounding the outer end of the arbor is placed between the plate K and the disc H.

Formed across the outer end face of the arbor E is a groove $e^2$ in which is placed a bar M secured to the arbor by two screws $m$, $m$ and the ends of the bar M extend radially outwards of the periphery of the arbor and enter recesses $k'$ $k'$ formed in the plate K. The ends of the bar M are stepped to form stops to limit the forward movement of the plate K.

A utensil such as N placed on the chuck should be a reasonably good fit thereon so that, when suction is applied to the space F, the base of the utensil is strongly pressed by atmospheric pressure against the cork insets $k$ of the plate K which yields back somewhat against the force of the spring L, affording a frictional drive between the cork insets and the base of the utensil. The bar M forms a driving connection between the plate K and the arbor E.

Air continuously enters the space F by passing between the wall of the utensil and the wall C of the chuck, and such air is liable to be contaminated by dust caused by the operation or otherwise; but such air passes through the perforated plate H, gauze $h^2$, steel wool J, gauze G and passages $b$; and all the dust is filtered out therefrom by the steel wool J and is prevented from passing back with the air to the valve and pump.

Figure 4:
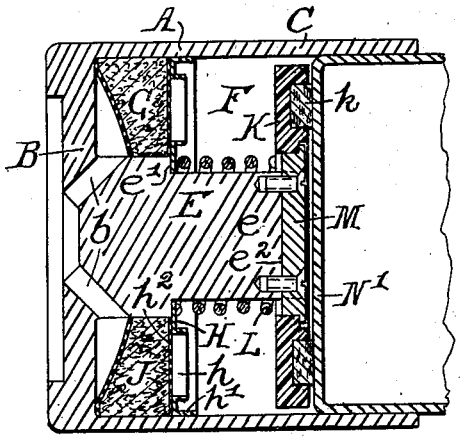
Figure 4 is a view corresponding to Figure 1, but partly broken away and illustrating a modification.

The construction shown in Figure 4 is similar to that shown in the previous figures; but the wall C is extended some distance forward of the end of the arbor E to adapt the chuck to receive a utensil N' internally.

Having fully described my invention what I claim and desired to secure by Letters Patent is:

1. A rotatable chuck in which articles are held in engagement therewith by suction comprising a casing in which suction is applied, an annular space in said casing and an annular filter in said space and through which the air stream caused by the suction is constrained to pass.

2. A rotatable chuck in which articles are held in engagement therewith by suction comprising a casing in which suction is applied, a base of said casing, a cylindrical side wall extending forwardly from said base, said side wall being open at its forward end, a centrally extending arbor rigid with said base, an annular space between said arbor and said wall, a suction passage in communication with said annular space, an annular filter in said space, an annular part surrounding the forward end of said arbor and being slidable thereon, elastic pressure means against the force of which said annular part can yield back, friction means at the forward face of said annular part with which the base of the article to be operated upon can be drivingly engaged, and driving means between said arbor and said annular part.

3. A rotatable chuck by which articles are held in engagement therewith by suction comprising a casing in which suction is applied, a base of said casing, a cylindrical side wall extending forwardly from said base, said side wall being open at its forward end, a centrally extending arbor rigid with said base, an annular space between said arbor and said wall, a suction passage in communication with said annular space, an annular filter in said space, an annular part surrounding the forward end of said arbor and being slidable thereon, elastic pressure means against the force of which said annular part can yield back, friction means at the forward face of said annular part with which the base of an article to be operated upon can be drivingly engaged, and driving means between said arbor and said annular part, a groove formed across the front face of said arbor, a bar located in said groove and having its ends projecting radially from the periphery of said arbor and recesses in said annular part in which the ends of said bar engage.

4. A rotatable chuck in which articles are held in engagement therewith by suction comprising a casing in which suction is applied, a base of said casing, a cylindrical side wall extending forwardly from said base, said side wall being open at its forward end, a centrally extending arbor rigid with said base, an annular space between said arbor and said wall, a suction passage in communication with said annular space, an annular filter in said space, an annular part surrounding the forward end of the said arbor and being slidable thereon, elastic pressure means against the force of which said annular part can yield back, and insets of resilient material set in the forward face of the said annular part, with which the base of an article to be operated upon can be drivingly engaged.

JOHN M. WYER.

REFERENCES CITED

The following references are of record in the file of this patent:

UNITED STATES PATENTS

| Number | Name | Date |
|---|---|---|
| 1,384,278 | Slacombe | July 12, 1921 |
| 1,618,378 | Hatcher | Feb. 22, 1927 |
| 1,744,313 | Kadow | Jan. 21, 1930 |
| 1,759,058 | Miller | May 20, 1930 |
| 2,154,086 | Eshbough | Apr. 11, 1939 |